US007237994B2

(12) United States Patent
Hepworth

(10) Patent No.: US 7,237,994 B2
(45) Date of Patent: Jul. 3, 2007

(54) WALL PLUG

(75) Inventor: Paul Steabben Hepworth, Guildford (GB)

(73) Assignee: Turner Intellectual Property Limited, Staffordshire (GB)

(*) Notice: Subject to any disclaimer, the term of this patent is extended or adjusted under 35 U.S.C. 154(b) by 0 days.

(21) Appl. No.: 10/883,956

(22) Filed: Jul. 2, 2004

(65) Prior Publication Data

US 2005/0002752 A1 Jan. 6, 2005

(30) Foreign Application Priority Data

Jul. 3, 2003 (GB) ................................ 0315548.8

(51) Int. Cl.
*F16B 13/06* (2006.01)

(52) U.S. Cl. ...................... 411/29; 411/387.1; 411/80.1

(58) Field of Classification Search .................. 411/29, 411/80.1–80.6, 387.1–387.8
See application file for complete search history.

(56) References Cited

U.S. PATENT DOCUMENTS 3,289,290 A * 12/1966 Sandor ........................ 29/432
3,715,952 A * 2/1973 Fischer ........................ 411/29
4,589,178 A * 5/1986 Staffeld ....................... 29/240
5,160,225 A * 11/1992 Chern ......................... 411/30
5,403,137 A * 4/1995 Grun et al. .............. 411/387.4
5,536,121 A * 7/1996 McSherry ..................... 411/31
5,662,673 A * 9/1997 Kieturakis .................. 606/185
5,836,405 A * 11/1998 Gschwend et al. ........... 175/57
6,004,085 A * 12/1999 Yamamoto et al. ........... 411/30
6,309,159 B1 * 10/2001 Weaver et al. ........... 411/387.5
6,679,661 B2 * 1/2004 Huang ......................... 411/29

FOREIGN PATENT DOCUMENTS

EP 0 425 358 B1 5/1991
EP 0 501 201 A1 9/1992
EP 0 557 292 B1 4/1994
EP 1072801 A2 1/2001
EP 1 298 331 A2 4/2003
WO WO 00/25031 A1 5/2000

* cited by examiner

*Primary Examiner*—Flemming Saether
(74) *Attorney, Agent, or Firm*—Steven E. Kahm; Nikolai & Mersereau, P.A.

(57) ABSTRACT

A wall plug for enabling fixings to be attached to a wall, the wall plug comprising an elongate body having an inner insertion end and an outer end, a through bore extending from the outer end toward the inner end, the through bore being adapted to axially receive an elongate drill of a setting tool, and body end portion extending axially in-board from said inner insertion end, the body end portion having at least one axially extending recess communicating with an axial end region of said through bore so as to expose a side portion of the setting tool when received in said through bore.

18 Claims, 3 Drawing Sheets

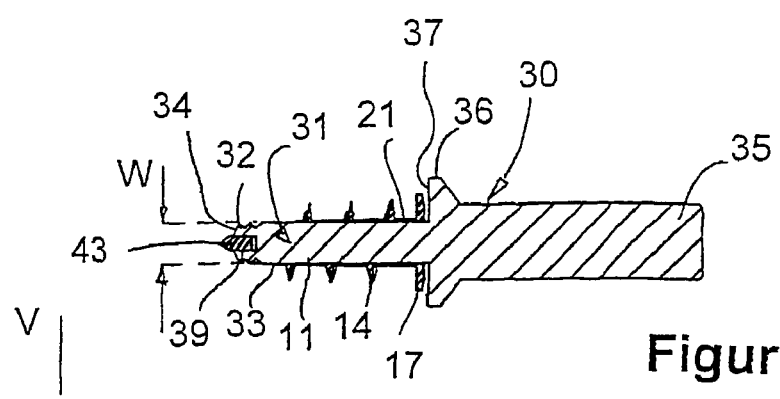
Figure 3
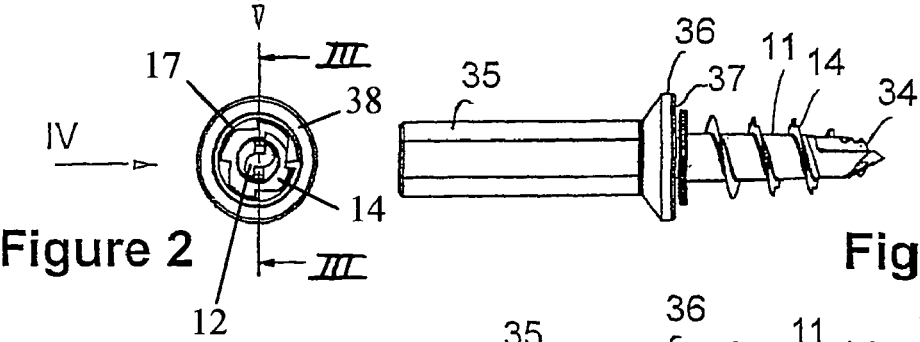
Figure 2
Figure 4
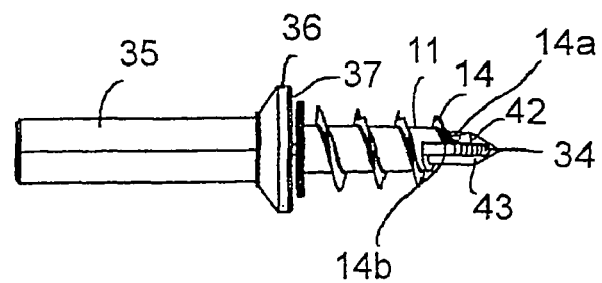
Figure 5

WALL PLUG

BACKGROUND OF THE INVENTION

1. Field of the Invention

The present invention relates to a wall plug for securing a fixing, such as a screw, to a wall.

In particular, the present invention relates to a wall plug assembly which enables the wall plug to be inserted into a wall without requiring the separate pre-drilling of an accommodating bore.

2. Description of the Related Art

'Self-tapping' wall plugs are known; for example see EP 0557292 and EP 0425358. Both EP 0557292 and 0425358 disclose a wall plug having an external screw thread which secures the plug axially within the wall once the plug has been fully inserted. The plug has a central through bore which axially accepts a blade-like drilling tool which protrudes axially beyond the terminal end of the wall plug.

In use, the blade-like tool is mounted in the chuck of a drill and a wall plug is axially slid onto the tool.

The terminal end of the tool is then presented to the surface of the wall into which the plug is to be inserted.

The tool is rotated by the drill and as it axially advances into the wall it drills out a pilot bore. When the terminal end of the wall plug reaches the pilot bore, it enters into the bore and the external threads on the wall plug bite into the bore walls to cause the wall plug to be axially advanced into the bore to its fully inserted position by a screwing action. Accordingly, with this type of wall plug, drilling of a pilot bore and insertion of the wall plug is conveniently carried out in one operation.

A problem with this type of arrangement is that initial entry of the terminal end of the wall plug into the pilot bore may prove difficult due to the screw threads on the wall plug failing to bite into the pilot bore and also due to the transition between the blade-like tool and the terminal end of the wall plug. This problem may result in the destruction of the screw-threads and/or an undesirable widening of the pilot bore entrance.

SUMMARY OF THE INVENTION

A general aim of the present invention is to provide a wall plug for securing a fixing to a wall which is of the self-tapping type but which attempts to avoid the above-mentioned problems.

According to one aspect of the present invention there is provided a wall plug for enabling fixings to be attached to a wall, the wall plug comprising an elongate body having an inner insertion end and an outer end, a through bore extending from the outer end toward the inner end, the through bore being adapted to axially receive an elongate drill of a setting tool, and body end portion extending axially in-board from said inner insertion end, the body end portion having at least one axially extending recess communicating with an axial end region of said through bore so as to expose a side portion of the setting tool when received in said through bore.

BRIEF DESCRIPTION OF THE DRAWINGS

Various aspects of the present invention are hereinafter described with reference to the accompanying drawings, in which:

FIG. 2 is an end view in the direction of arrow II (FIG. 1) showing the wall plug mounted on a setting tool according to an embodiment of the present invention;

FIG. 3 is a sectional view taken along line III—III in FIG. 2;

FIG. 4 is a side view as viewed in the direction of arrow IV (FIG. 2);

FIG. 5 is a side view as viewed in the direction of arrow V (FIG. 2);

DESCRIPTION OF THE PREFERRED EMBODIMENTS

Figure 1:
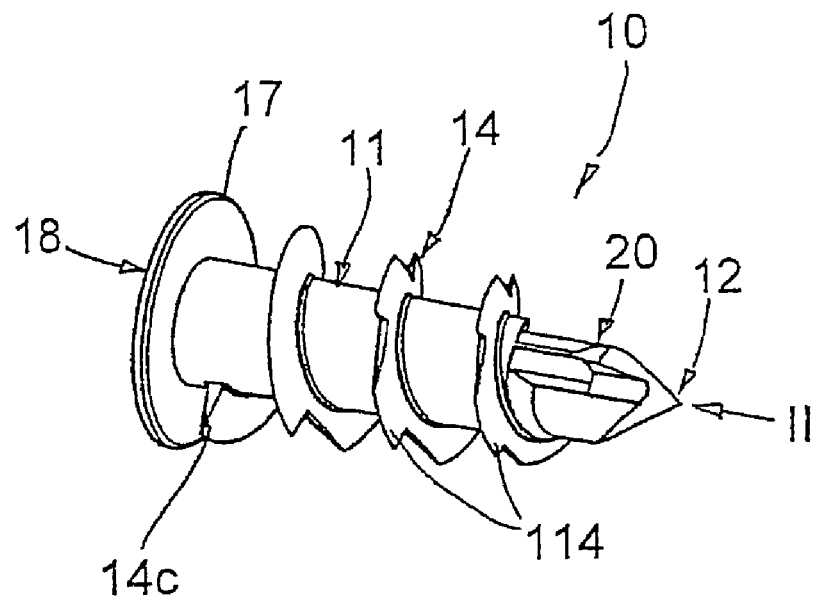
FIG. 1 is a perspective view of a wall plug according to an embodiment of the present invention.
Figure 3A:
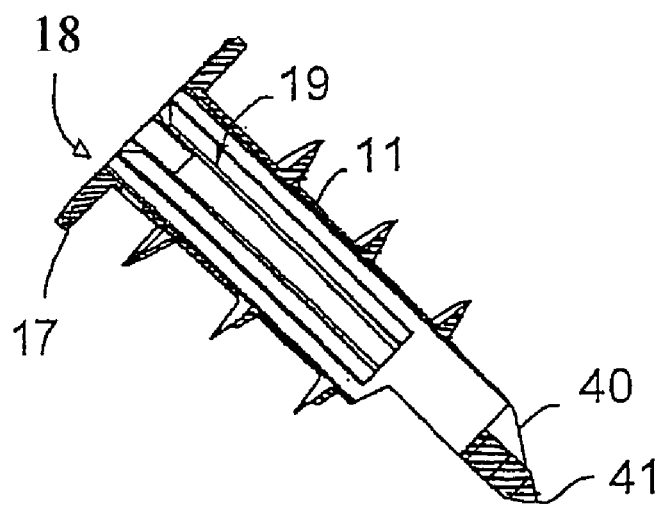
FIG. 3a is a sectional view taken along line III—III in FIG. 2 with the setting tool omitted.
Figure 6:
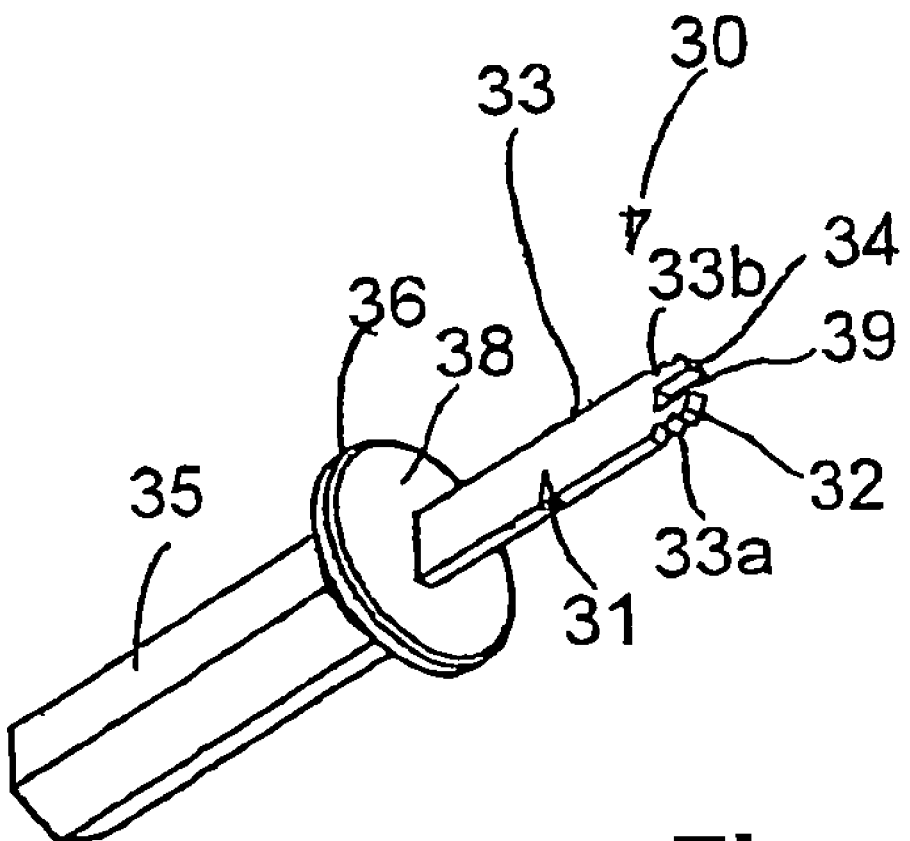
FIG. 6 is a perspective view of the setting tool shown in FIGS. 2 to 5.

The wall plug 10 shown in FIG. 1 includes an elongate body 11 having a terminal insertion end 12 and at least one helical rib 14 extending longitudinally along the outer face of the elongate body 11 to define an external screw thread. As shown in FIG. 3a, a centrally located bore 19 extends longitudinally through the elongate body 11 for accepting a fixing, such as a screw or threaded bolt, once the wall plug has been inserted into a wall.

Preferably a radially extending flange 17 is provided at the outer end 18 of the elongate body 11 opposite to that of terminal end 12. The flange 17 acts as a stop which engages the outer surface of the wall into which the plug 10 is inserted in order to prevent further axial insertion of the wall plug 10 once fully inserted.

Preferably the elongate body 11, helical rib(s) 14 and radial flange 18 are integrally moulded to form a one-piece wall plug.

A body end portion 20 of the elongate body 11 extends axially in-board from terminal end 12 and defines a bore drilling region.

A slot-like channel 21 extends longitudinally along the interior of the elongate body 11 from its outer end 17 for receiving a setting tool 30.

The setting tool 30 includes an elongate body 31 of blade-like form which is axially insertable into the slot-like channel 21. The body 31 is mounted at one end in a mounting boss 35 which in use is mounted in a drill chuck. The boss 35 preferably includes a radial flange 36 which defines a shoulder 37 to limit insertion of the boss into the drill chuck and also defines an axial end wall 38 against which flanges 17 of a wall plug 10 mounted on body 31 may abut.

The cross-sectional shape and dimensions of the elongate body 31 and channel 21 are complimentary so as to constrain the body 11 and body 31 against relative rotation, i.e. rotation of the cutting tool 30 about the longitudinal axis of body 31 causes rotation of the elongate body 11.

In the region of body end portion 20, the opposed top and bottom sides of slot-like channel 21 are preferably open and in addition one side of the channel 21 which is located to one side of the axis of body 11 is open and the opposite side of the channel 21 located to the opposite side on the other side of the axis of body 11.

Accordingly, when body 31 is inserted into channel 21, the terminal region 32 of body 31 is exposed.

The diameter of the end body portion 20 of elongate body 11 is preferably the same as or less than the width W of the body 31 so that the side edges 33 of body 31 are flush with or protrude above the adjacent outer face of the body portion 20. The terminal end 32 of the elongate body 31 is preferably provided with an open ended axially extending slot 39. In addition the terminal end 12 of the wall plug 10 is preferably defined by a conical portion 40 terminating in a tip 41. A pair of axially extending diametrically opposed open sided slots 42 are provided in the conical portion 40 which form an axial extension to channel 21 and which are spaced apart by a land 43. Accordingly, as seen in FIGS. 3 to 5, on insertion of body 31 into the wall plug 10, land 43 enters into slot 39 and so enables the axial end face 34 of the terminal end 32 to be axially located closely in board of the tip 41.

Accordingly, during insertion of the wall plug 10 into a wall, the exposed axial end face 34 and side edges 33 of body 31 act to drill a bore into the wall and at the same time shield the outer face of the end body portion 20 from the drilling action.

In other words, the end body portion 20 is located within the pilot hole as it is being formed by the terminal region 32 of the setting tool body 31. There is therefore no requirement with the present invention for the end region of the wall plug to axially enter into a pilot bore since it is already constrained within the pilot bore as it is being formed.

The start 14a of the helical thread 14 is preferably located within end body portion 20. The start 14a is preferably defined by a planar end face 14b which lies in a plane parallel to the axis of rotation of the wall plug. With such an arrangement, the end face 14b directly opposes the direction of rotation of the wall plug 10 during insertion and so presents a cutting load-in face which is fully supported from behind by the body of the helical rib 14.

Preferably the height of the helical rib 14 at start 14a is less than its height at its finish 14c and progressively increases in height along its length from start 14a to finish 14c. Preferably the helical rib 14 is provided with teeth formations 114 spaced along its length to promote cutting of the helical rib 14 into surrounding material of the wall into which the wall plug is being inserted.

Preferably, the side edges 33 are shaped to define a series of projections 33a axially spaced by troughs 33b. The projections 33a act to cut grooves in the side wall of the pilot hole and so facilitate biting of the end face 14b into the material of the wall into which the wall plug is being inserted.

Preferably the wall plug 10 is moulded in one-piece from a suitable plastics material such as a polyamide.

It is envisaged that channel 21 may extend completely through body 11 to enable the blade-like body 31 to project beyond the terminal end of the body 11. In this manner, initial cutting of the pilot hole will occur axially beyond the terminal end of body 11. However, due to the provision of the end body portion 20 the benefits of the present invention are still provided.

It is also envisaged that the conical portion 40 may be formed by an insert of a different material to that of the remainder of body 11. This enables a relatively hard material, such as a metal, to be used to assist the drilling action whilst using a relatively soft material, such as plastics, for forming the body 11.

I claim:

1. A wall plug for enabling fixings to be attached to a wall, the wall plug comprising, an elongate body having an inner insertion end and an outer end, a through bore extending from the outer end toward the inner insertion end, the through bore being adapted to axially receive an elongate drill of a setting tool, and a body end portion extending axially in-board from said inner insertion end, the body end portion having at least one axially extending radial recess extending parallel to a central axis of the wall plug and communicating with an axial end region of said through bore beginning at a position aft of the inner insertion end and running toward the outer end to allow exposure of adjacent side portions of the setting tool, which determine a cutting edge, when the setting tool is received in said through bore, whereby the radial recess allows the cutting edge to engage the wall for effective drilling thereof.

2. An apparatus, for enabling fixings to be attached to a wall, comprising the wall plug according claim 1 and the setting tool having the elongate drill which is insertable into said through bore.

3. An apparatus according to claim 2 wherein the diameter of the body end portion is the same as or less than the, cross-sectional drilling width of the drill.

4. An apparatus according to claim 3 wherein the drill has a polygonal cross-sectional shape.

5. An apparatus according to claim 4 wherein the through bore has a complimentary polygonal cross-sectional shape to tat of the drill.

6. An apparatus according to claim 2 wherein the drill has a polygonal cross-sectional shape.

7. An apparatus according to claim 6 wherein the through bore has a complimentary polygonal cross-sectional shape to that of the drill.

8. A wall plug according to claim 1 wherein the elongate body is provided with at least one screw thread rib extending helically along the outer surface of the elongate body.

9. An apparatus, for enabling fixings to be attached to a wall, comprising the wall plug according claim 8 and the setting tool having the elongate drill which is insertable into said through bore.

10. An apparatus according to claim 9 wherein the diameter of the body end portion is the same as or less than the cross-sectional drilling width of the drill.

11. A wall plug according to claim 8 wherein the at least one screw thread has a start end located with said body end portion.

12. An apparatus, for enabling fixings to be attached to a wall, comprising the wall plug according claim 11 and the setting tool having the elongate drill which is insertable into said through bore.

13. An apparatus according to claim 12 wherein the diameter of the body end portion is the same as or less than the cross-sectional drilling width of the drill.

14. A wall plug according to claim 11 wherein the inner end of the elongate body is defined by a conical tip.

15. A wall plug according to claim 8 wherein the inner end of the elongate body is defined by a conical tip.

16. A wall plug according to claim 1 wherein the inner end of the elongate body is defined by a conical tip.

17. An apparatus, for enabling fixings to be attached to a wall, comprising the wall plug according claim 16 and the setting tool having the elongate drill which is insertable into said through bore.

18. An apparatus according to claim 17 wherein the diameter of the body end portion is the same as or less than the cross-sectional drilling width of the drill.

* * * * *